Aug. 15, 1944. A. A. ALBERT 2,355,839
SHOWCASE
Filed May 30, 1942
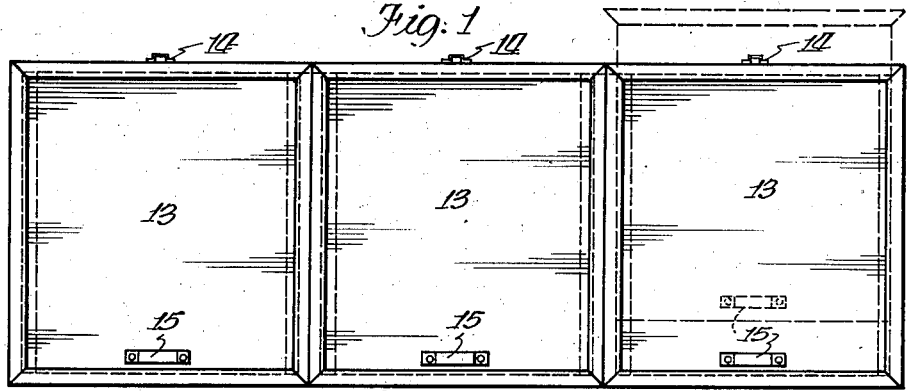
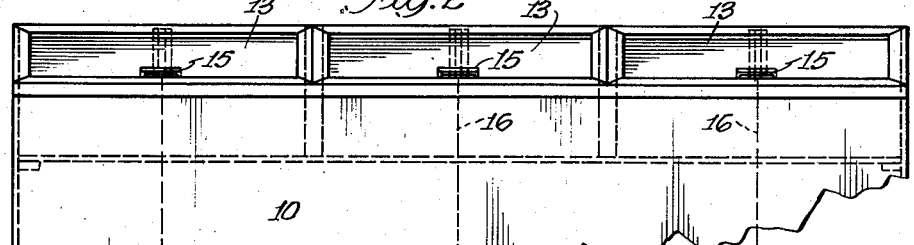
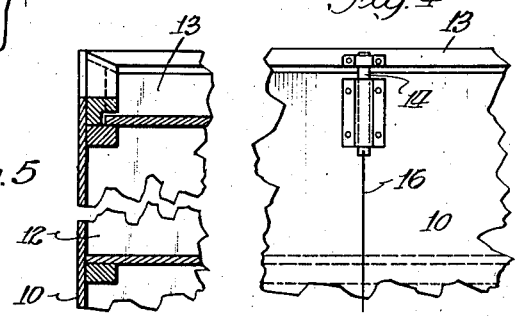
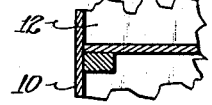
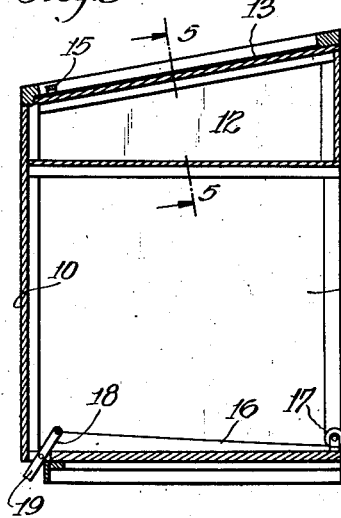
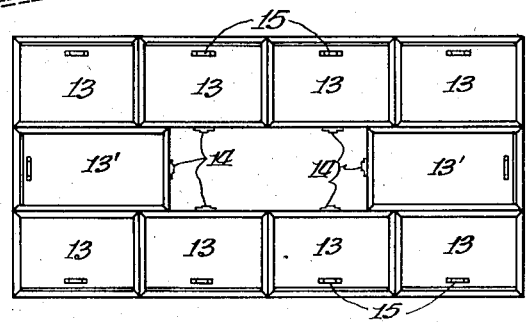
Inventor:
Arthur A. Albert
Archibald D. McKellar
By: Attorney.

Patented Aug. 15, 1944

2,355,839

UNITED STATES PATENT OFFICE 2,355,839

SHOWCASE

Arthur A. Albert, Chicago, Ill.

Application May 30, 1942, Serial No. 445,239

3 Claims. (Cl. 312—193)

The invention relates to improvements in cabinets and has for its primary object the provision of a simple and efficient cabinet so constructed and arranged as to facilitate the sale of goods.

Another object of the invention is the provision of a cabinet so constructed and arranged as to facilitate the display and sale of goods and at the same time minimize the danger of theft.

Other objects will appear hereinafter.

The invention consists of the combination and arrangement of parts hereinafter described and claimed.

The invention will be best understood by reference to the accompanying drawing forming a part of this specification, in which—

Figure 1 is a top plan view of a cabinet embodying the invention;

Fig. 2, a partial front view thereof;

Fig. 3, a central medial section of the same;

Fig. 4, a detailed view illustrating a latch arrangement employed in the construction;

Fig. 5, an enlarged partial section taken substantially on line 5—5 of Fig. 5; and Fig. 6, a plan view of a more extended arrangement of cabinet sections.

The embodiment of the invention illustrated in the drawing comprises a cabinet 10 made up of three sections and provided in its lower portion with a large continuous stock compartment 11 extending the full length thereof and entirely open at its rear. The upper portion of the cabinet 10 is divided into three sections or compartments 12, each having an upwardly and rearwardly slidable cover member 13 made of material adapted to support and have samples secured thereto. A spring-held latch bolt 14 is arranged as shown at the rear edge of each cover 13, and a handle member 15 is provided at the front edge of each cover member to facilitate the opening thereof when the latch 14 is released. By this arrangement provision is made whereby samples of goods, such as hardware or the like, may be attached to the cover member 13 and thus attractively displayed for sale, and a supply of said articles may be kept in the corresponding compartment 12 so as to be readily exposed for delivery when a sale is consummated. By arranging the cover member 13 at a slight upward and rearward inclination, the samples secured thereto will be attractively and advantageously displayed to a customer in front of the cabinet and at the same time the seller at the rear of the cabinet can also see any sample designated by the customer.

The releasing element 16 is secured to each of the latch bolts 14 and extends thence downwardly to a position adjacent the bottom of the cabinet, thence forwardly under the guide pulley 17 and is connected at its outer end with a toe lever 18, having its end 19 projecting as indicated through an opening at the front lower edge of the cabinet as shown. Each releasing element 16 is also provided adjacent the bottom of the rear side of the cabinet with a foot treadle 20 electrically welded thereto, as shown. By this arrangement the seller standing behind the cabinet may readily step upon the treadle 20 to release the cover 13 when it is desired to have access to the contents of compartment 12, or if the seller is standing at the outer or front side of the cabinet he may readily touch the lever 19 with his toe and thus also release the cover 13. As mounted, the lever end 19 is positioned under the front edge of the cabinet and therefore partially concealed from view so that the goods in the compartment 12 are thus protected against theft.

In the arrangement illustrated in Fig. 6, two cabinets of four sections each, and having covers 13, are arranged in spaced parallel relation, and somewhat longer cabinets having covers 13', are arranged between the ends of the four sectioned cabinets, as shown. By this arrangement a central space for the accommodation of the seller is provided, with a large number of sections arranged conveniently and readily accessible for obvious reasons.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A cabinet having a compartment at its top; a shiftable cover for said compartment; a depressible spring held latch bolt for said cover located on the rear wall of said cabinet; a releasing element attached to said bolt and extending thence downwardly to the bottom of said cabinet and thence forwardly to the front edge thereof; and foot operable means at the bottoms of the front and rear walls of said cabinet and arranged to operate said releasing element to withdraw said bolt.

2. The construction specified in claim 1 in which the foot operable means at the front of the cabinet is a partially concealed toe lever.

3. The construction specified in claim 1 in which the foot operable means at the front of the cabinet is a partially concealed toe lever, and that at the rear of the cabinet is a depressible foot treadle on said releasing element.

ARTHUR A. ALBERT.